(12) United States Patent
Girondi

(10) Patent No.: US 7,708,879 B2
(45) Date of Patent: May 4, 2010

(54) FUEL FILTER FOR DIESEL INTERNAL COMBUSTION ENGINES

(75) Inventor: Giorgio Girondi, Mantova (IT)

(73) Assignee: URI Filters S. p. A., Porto Mantovano (Mantova) (IT)

( * ) Notice: Subject to any disclaimer, the term of this patent is extended or adjusted under 35 U.S.C. 154(b) by 720 days.

(21) Appl. No.: 11/587,243

(22) PCT Filed: May 13, 2005

(86) PCT No.: PCT/EP2005/005386

§ 371 (c)(1),
(2), (4) Date: Oct. 23, 2006

(87) PCT Pub. No.: WO2005/118102

PCT Pub. Date: Dec. 15, 2005

(65) Prior Publication Data

US 2007/0221560 A1    Sep. 27, 2007

(30) Foreign Application Priority Data

Jun. 1, 2004    (IT) .......................... RE2004A0066

(51) Int. Cl.
*B01D 35/14*    (2006.01)
(52) U.S. Cl. .................. 210/86; 210/96.1; 210/103; 210/149; 210/184; 210/299; 210/443

(58) Field of Classification Search ........... 96/417–423; 210/85, 86, 103, 104, 143, 149, 184, 299–305, 210/440, 443, 96.1
See application file for complete search history.

(56) References Cited

U.S. PATENT DOCUMENTS

| 3,235,084 | A | 2/1966 | King et al. |
| 4,522,166 | A | 6/1985 | Toivio et al. |
| 4,680,110 | A * | 7/1987 | Davis .......................... 210/114 |
| 6,147,335 | A | 11/2000 | Arx et al. |
| 6,402,943 | B1 | 6/2002 | Bohlender |
| 2005/0109680 | A1* | 5/2005 | Moscaritolo et al. .......... 210/85 |

FOREIGN PATENT DOCUMENTS

| DE | 8515074 U1 | 7/1985 |
| DE | 201 15 220 U1 | 2/2003 |
| EP | 0 405 447 A2 | 1/1991 |
| WO | WO 03/076792 A1 | 9/2003 |

\* cited by examiner

*Primary Examiner*—Joseph W Drodge
(74) *Attorney, Agent, or Firm*—Browdy & Neimark, PLLC

(57) ABSTRACT

For diesel internal combustion engines, an improved filter unit comprising an outer casing the interior of which is separated by a filtering baffle into two separate chambers to which a fuel inlet conduit and a fuel outlet conduit are connected respectively, with said casing there being associated a device provided with sensors for measuring certain characteristic parameters for correct engine operation.

7 Claims, 2 Drawing Sheets

FUEL FILTER FOR DIESEL INTERNAL COMBUSTION ENGINES

TECHNICAL FIELD

The present invention relates to a filter unit to be associated with diesel internal combustion engines, and in particular to a filter unit provided with a combined device for measuring certain parameters which enable functional characteristics of the engine to be monitored and/or adjusted.

PRIOR ART

For their correct operation, modern diesel engines require numerous parameters to be measured, such as the diesel fuel temperature, or possible water presence in the fuel filter.

The known art teaches that some of the parameters to be measured are measured by a plurality of individual devices associated with the fuel filter. For example, devices are known for sensing water presence in the filter, devices for measuring fuel temperature, and devices for regulating the fuel temperature within the filter to facilitate engine start under unfavourable climatic conditions.

All these devices are currently associated individually with the filter and are often composed of disposable measurement and/or checking elements, i.e. which are replaced together with the filter and are therefore necessarily elements of low quality. Specifically, on replacing the filter, the user has to remove all the connection plugs of each sensor of the individual devices to then reconnect them to the sensors installed on the new filter. In view of the large number of sensors, all this represents a considerable time, and a possible source of connection errors.

There is therefore a need for a filter unit provided with a combined device which comprises all the sensors required to measure engine operating parameters and is simple to install on replacing the filter.

DISCLOSURE OF THE INVENTION

The object of the present invention is to satisfy said requirement within the context of a simple, rational and low-cost solution.

The invention attains said object by virtue of a filter unit in accordance with claim 1.

Specifically the invention provides, for diesel internal combustion engines, a filter unit comprising an outer casing the interior of which is separated by a filtering baffle into two separate chambers to which a fuel inlet conduit and a fuel outlet conduit are connected respectively, in the interior of said casing there being housed a device, removable from outside the casing, for measuring certain characteristic parameters for correct engine operation.

The dependent claims describe particular advantageous embodiments of the filter unit of the invention.

BRIEF DESCRIPTION OF THE DRAWINGS

The characteristics and the constructional merits of the invention will be more apparent from the ensuing description given with reference to the figures of the accompanying drawings which illustrate a particular preferred embodiment by way of non-limiting example.

BEST MODE FOR CARRYING OUT THE INVENTION

Figure 1:
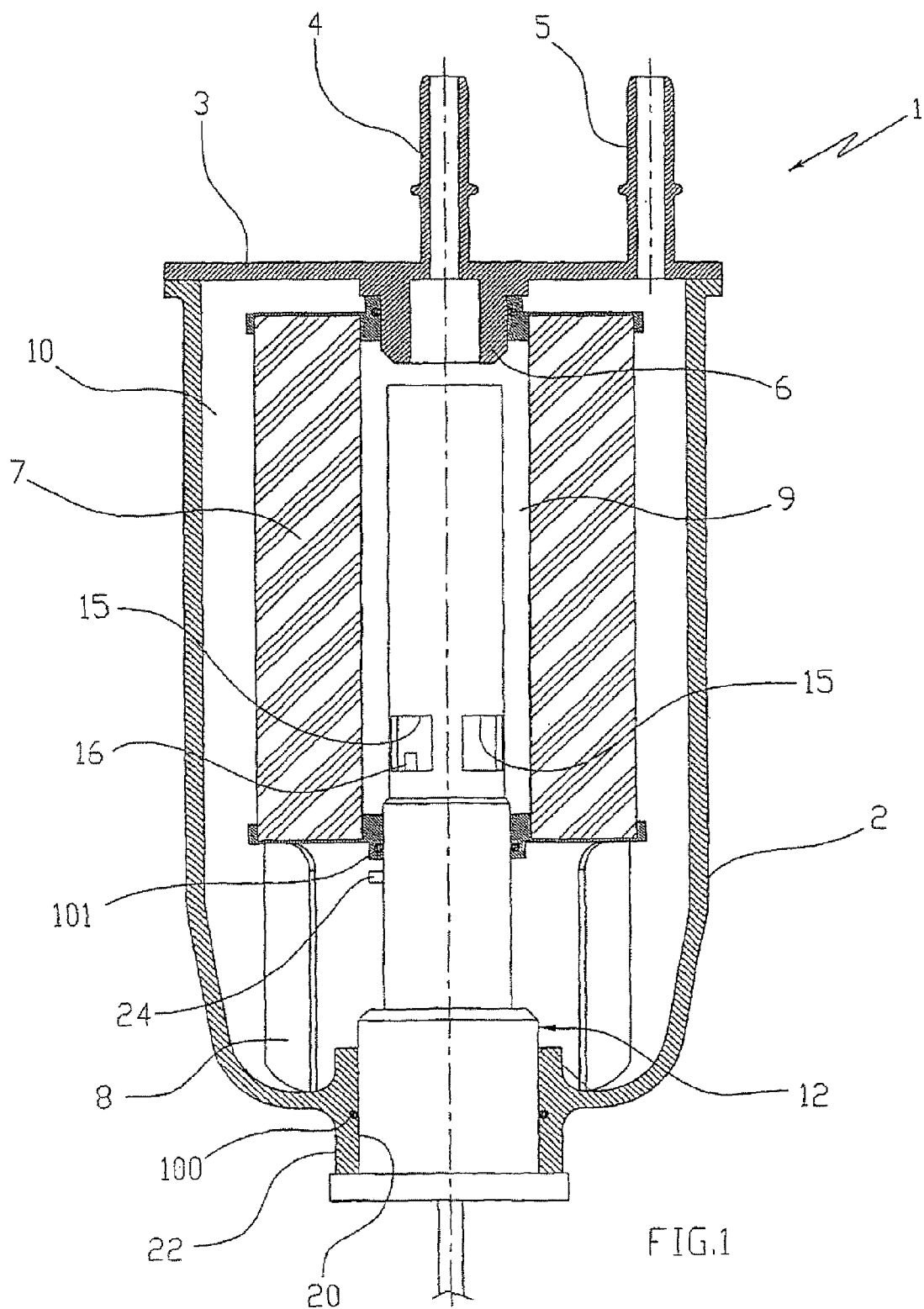
FIG. 1 is a side section through the filter unit of the invention.

Said figures show the filter unit 1, comprising a cup-shaped outer casing 2 closed upperly by a cover 3 on which a fuel inlet conduit 5 and a fuel outlet conduit 5 are positioned.

The inlet conduit 4, positioned centrally, extends below the cover to define a stem 6, the function of which will be clarified hereinafter.

The interior of the casing 2 houses a toroidal filtering baffle 7 supported between a lower end 8 and the stem 6 branching from the cover 3.

Said filtering baffle 7 divides the interior of the casing 2 substantially into two separate chambers 9 and 10, of which the first, 9, is connected to the inlet conduit 4 for the fuel to be filtered, and the second, 10, is connected to the outlet conduit 5 for the filtered fuel.

The casing 2 lowerly presents a tubular hole 20 which receives a device 12 carrying sensors for measuring a certain number of parameters necessary for correct operation of the engine, not shown, provided with the filter unit 1.

In the illustrated embodiment, the device 12 contains a temperature measurement sensor, a fuel heating device, and a sensor for sensing water collected on the base of the casing 2.

Figure 2:
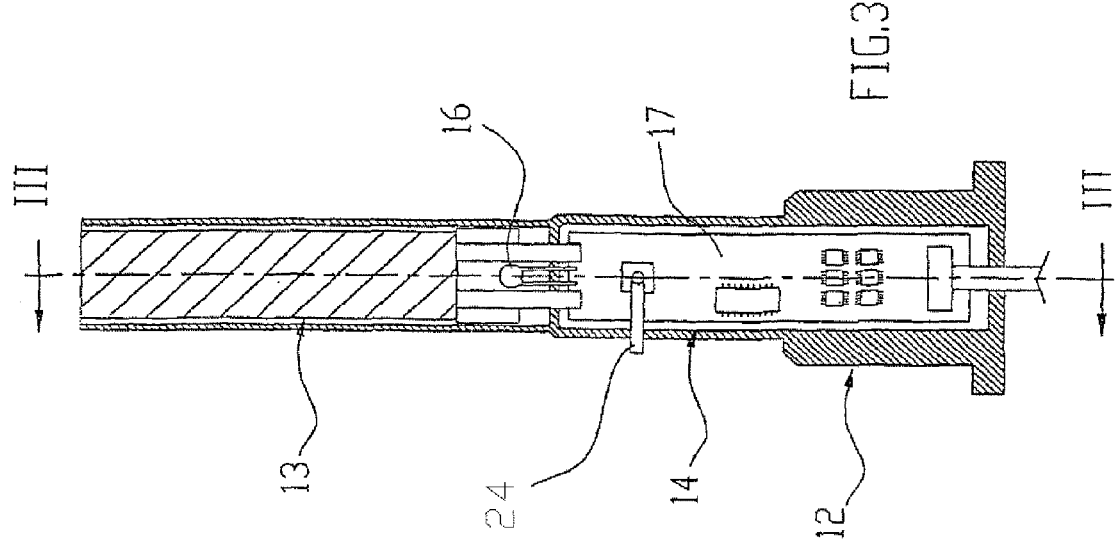
FIG. 2 is a schematic section, taken on the line II-II of FIG. 1, through the combined device with which the unit of the invention is provided.
Figure 3:
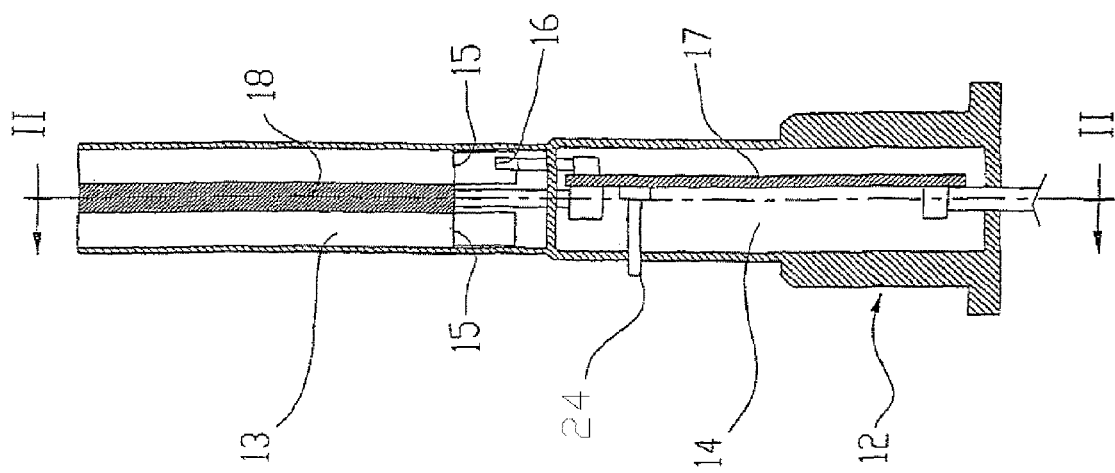
FIG. 3 shows the section III-III of FIG. 2.

With particular reference to FIGS. 2 and 3, the device 12 is shaped externally as a shaft of differing cross-section which is inserted under sealed conditions, by virtue of gaskets 100 and 101, into the casing 2 and the filtering baffle 7, and extends nearly as far as the stem 6. Said device 12 and the filtering baffle 7 then together define said chambers 9 and 10. The device 12 is made rigid with the casing 2 by a usual fixing means, not shown, such as a peg or a set screw.

Internally the device 12 is hollow and divided into two separate portions, of which the upper portion 13 is positioned inside the chamber 9 and the underlying lower portion 14 is positioned inside the chamber 10.

The upper portion 13 is upperly open, being in the form of a cup, and presents two rectangular apertures 15 in its lateral surface.

The portion 13 houses in its interior, in proximity to said apertures 15, a sensor 16 for measuring the fuel temperature, said sensor being connected to an electronic control card 17 housed in the lower portion 14 of the device.

The upper portion 13 also houses in its interior a heating device 18, of known type, also connected to said electronic control card 17.

The device 12 also comprises sensors which sense the presence of an excessive quantity of water accumulated in the bottom of the casing 1. In the illustrated embodiment said sensors comprise two inductive electrodes 24 which branch from the outer surface of the lower portion 14 of the device 12 and are connected to said control card 17.

The control card 17 is connected to the vehicle control system by a data transmission cable 19.

This integration of all sensors within the device 12 enables the filter to be easily and quickly replaced. For this purpose, after removing the fixing means, not shown, the operator has merely to withdraw the device 12 from the casing 2 and reinsert it into the casing of the new filter unit, hence enabling better quality components to be used.

It should also be noted that the shaft-like construction of the device 12 offers the further advantage that no sensor components are disposed of as happens in the known art, so considerably reducing the overall cost of the filter unit.

Finally, in other embodiments the device 12 can incorporate sensors different in terms of number and/or function from those previously described.

The invention claimed is:

1. For vehicles having diesel internal combustion engines, an improved filter unit comprising:
   an outer casing the interior of which is separated by a filtering baffle into a first chamber and a second chamber, to which a fuel inlet conduit and a fuel outlet conduit are connected respectively, comprising:
   a removable device received within the casing through a tubular hole, coaxial to the filter baffle in a position opposite to said inlet and outlet conduits,
   wherein said device has an elongated shape internally comprising a first portion that is positioned entirely inside the first chamber and a second portion that is separate from the first portion and is positioned inside the second chamber near the tubular hole,
   wherein the first portion houses sensors for measuring and optionally controlling at least one characteristic parameter for correct engine operation, and the second portion houses a water level sensor for measuring the level of water which accumulates at the bottom of the casing,
   wherein all said sensors are permanently connected to an electronic control means which is incorporated into said removable device and to a component enabling the device to be permanently connected to a control system of the vehicle to which the filter is applied.

2. A unit as claimed in claim 1, wherein a seal gasket is interposed between said removable device and said filtering baffle.

3. A unit as claimed in claim 1, wherein said removable device is shaped as a shaft with different cross-sections.

4. A unit as claimed in claim 3, wherein said first portion presents in its outer surface at least one aperture for fuel entry.

5. A unit as claimed in claim 1, wherein said sensors comprise a temperature measurement device and a heating device.

6. A filter unit as claimed in claim 4, wherein said electronic control component comprises an electronic control card.

7. A filter unit as claimed in claim 1, characterised in that said water level sensor comprises two inductive electrodes which branch from the outer surface of the second portion of the removable device.

* * * * *

UNITED STATES PATENT AND TRADEMARK OFFICE
CERTIFICATE OF CORRECTION

PATENT NO. : 7,708,879 B2 Page 1 of 1
APPLICATION NO. : 11/587243
DATED : May 4, 2010
INVENTOR(S) : Giorgio Girondi It is certified that error appears in the above-identified patent and that said Letters Patent is hereby corrected as shown below:

On the Title Page, Item (73) Assignee, correct the incorrectly spelled name by deleting "URI FILTERS S.P.A." and insert --UFI FILTERS S.P.A.--.

Signed and Sealed this

Thirteenth Day of July, 2010

David J. Kappos
*Director of the United States Patent and Trademark Office*